United States Patent [19]
Cavitt et al.

[11] Patent Number: 5,834,078
[45] Date of Patent: Nov. 10, 1998

[54] HYDROXY-FUNCTIONALIZED POLY (AMINO ETHER) SALTS

[75] Inventors: Michael B. Cavitt; Jerry E. White; John M. Beckerdite, all of Lake Jackson, Tex.; H. Craig Silvis, Midland, Mich.

[73] Assignee: The Dow Chemical Company, Midland, Mich.

[21] Appl. No.: 916,976

[22] Filed: Aug. 14, 1997

[51] Int. Cl.$^6$ .............................. B29D 22/00; C08K 3/02; C08F 6/00

[52] U.S. Cl. ......................... 428/35.7; 528/486; 528/487; 528/490; 528/491; 528/492; 528/494; 528/503; 524/706; 524/710; 524/713; 524/714; 524/745; 524/755; 524/773; 428/35.4; 428/35.8; 428/304.4; 428/480

[58] Field of Search ..................................... 528/486, 487, 528/490, 491, 492, 494, 503; 524/706, 710, 713, 714, 745, 755, 773; 428/35.4, 35.7, 35.8, 304.4, 480

[56] References Cited

U.S. PATENT DOCUMENTS

| | | | |
|---|---|---|---|
| 4,451,581 | 5/1984 | Bolto et al. | 521/28 |
| 4,888,446 | 12/1989 | Klein et al. | 564/478 |
| 5,275,853 | 1/1994 | Silvis et al. | 428/35.4 |
| 5,320,716 | 6/1994 | Akhtar | 204/59 |
| 5,464,924 | 11/1995 | Silvis et al. | 528/102 |

*Primary Examiner*—Samuel A. Acquah
*Attorney, Agent, or Firm*—Nemia C. Damocles

[57] ABSTRACT

Poly(hydroxyaminoether) ammonium salts are prepared by contacting a poly(hydroxy amino ether) with a protonic acid or an alkyl halide in an amount and under reaction conditions sufficient to form a poly(hydroxy amino ether) ammonium salt having an oxygen transmission rate of less than about 0.5 $cm^3$-mil/100 $in^2$-atm($O_2$)-day.

18 Claims, No Drawings

HYDROXY-FUNCTIONALIZED POLY (AMINO ETHER) SALTS

BACKGROUND OF THE INVENTION

This invention relates to polyethers having pendant hydroxyl moieties and to methods of using them as barrier articles to protect oxygen-sensitive materials. More particularly, this invention relates to salts of hydroxy-functionalized polyetheramines.

Hydroxy-functionalized polyetheramines are known and are described, for example, in U.S. Pat. Nos. 5,275,853 and 5,464,924. These polyetheramines exhibit oxygen transmission rates of from 0.57 to 19 $cm^3$-mil/100 $in^2$-atm ($O_2$)-day, and are useful in the fabrication of barrier containers and films and as molding, extrusion and casting resins.

It would be desirable to provide new hydroxy-functionalized polyetheramines having oxygen transmission rates that are less than 0.5 $cm^3$-mil/100 $in^2$-atm($O_2$)-day.

SUMMARY OF THE INVENTION

In a first aspect, the present invention is a salt of a hydroxy-functionalized polyetheramine wherein at least one of the backbone nitrogen atoms is tetracoordinate and positively charged and the total positive charge is balanced with negatively charged counter ions.

In a second aspect, the present invention is a process which comprises contacting a hydroxy-functionalized polyetheramine with a protonic acid or an alkyl halide in an amount and under reaction conditions sufficient to form a hydroxy-functionalized polyetheramine salt having an oxygen transmission rate of less than about 0.5 $cm^3$-mil/100 $in^2$-atm($O_2$)-day.

DETAILED DESCRIPTION OF THE INVENTION

Preferably, the hydroxy-functionalized polyetheramine salt of the present invention has repeating units represented by any one of the following formulas:

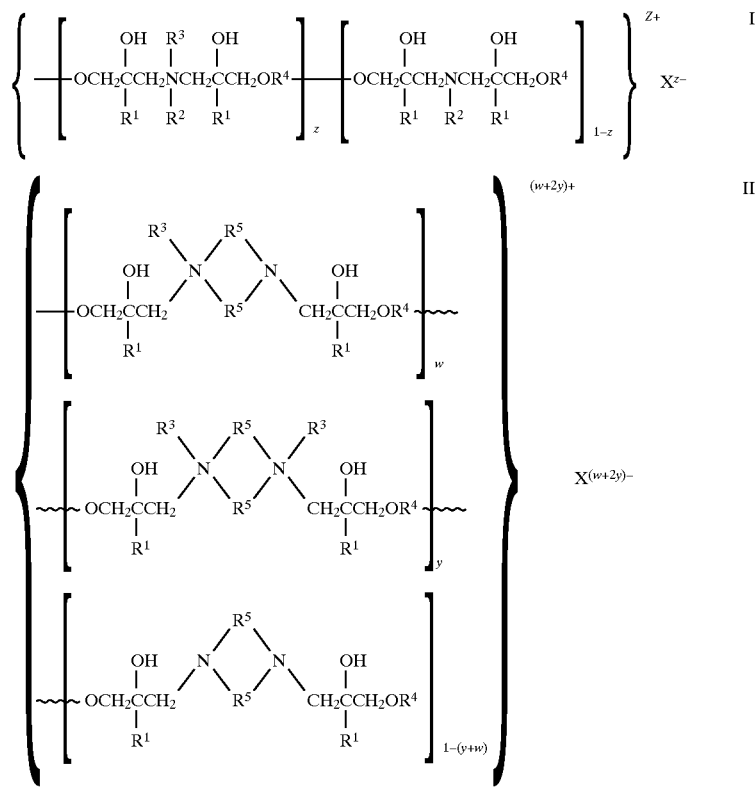

-continued

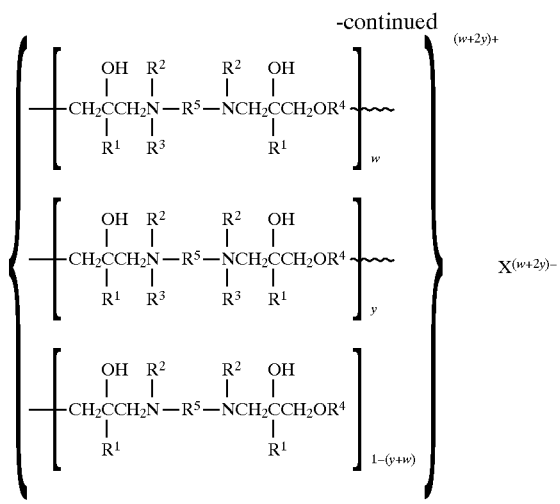

wherein $R^1$ is a hydrocarbyl group or hydrogen; $R^2$ is a hydrocarbyl or substituted hydrocarbyl group; $R^3$ is hydrogen, a hydrocarbyl or substituted hydrocarbyl group, wherein the substituent(s) in the substituted hydrocarbyl group is hydroxyl, cyano, halo, arlyoxy, alkylamido, arylamido, alkylcarbonyl, or arylcarbonyl; $R^4$ and $R^5$ are independently hydrocarbylene moieties; z is a number from about 0.01 to about 1; w is a number from 0 to about 1 and y is a number from 0 to about 1 such that (w+y) equals about 0.01 to about 1; n is a number from about 5 to about 1000; and X is a negatively charged counterion or combination of such ions present in sufficient amount to balance the total positive charge of the tetracoordinate nitrogen atoms.

Representative divalent organic moieties useful as $R^4$ and $R^5$ include alkylene, cycloalkylene, alkylenearylene, poly(alkyleneoxyalkylene), alkylenethioalkylene, alkylenesulfonylalkylene, alkylene substituted with at least one hydroxyl group, cycloalkylene substituted with at least one hydroxyl group, alkylenearylene substituted with at least one hydroxyl group, poly(alkyleneoxyalkylene) substituted with at least one hydroxyl group, alkylenethioalkylene substituted with at least one hydroxyl group, alkylenesulfonylalkylene substituted with at least one hydroxyl group; arylene, dialkylenearylene, diaryleneketone, diarylenesulfone, diarylene oxide and diarylene sulfide.

In the more preferred hydroxy-functionalized polyetheramine salts, $R^1$ is hydrogen, methyl, ethyl, propyl, butyl, pentyl, hexyl, cyclohexyl, benzyl, phenyl; $R^2$ is methyl, ethyl, propyl, butyl, pentyl, hexyl, cyclohexyl, benzyl, phenyl, 2-hydroxyethyl, 2-hydroxypropyl, 3-hydroxypropyl, 2-acetamidoethyl or a combination of these moieties; $R^3$ is hydrogen, methyl, ethyl, propyl, butyl, pentyl, hexyl, cyclohexyl, benzyl, phenyl, 2-hydroxyethyl, 2-hydroxypropyl, 3-hydroxypropyl, 2-acetamidoethyl or a combination of these moieties; and $R^4$ and $R^5$ are independently methylene, ethylene, propylene, butylene, pentamethylene, hexamethylene, heptamethylene, octamethylene, nonamethylene, decamethylene, dodecamethylene, 1,4-cyclohexylene, 1,3-cyclohexylene or 1,2-cyclohexylene optionally substituted with at least one hydroxyl group, p-phenylene, m-phenylene, or 2,6-naphthalene, diphenylene-isopropylidene, sulfonyldiphenylene, carbonyldiphenylene, oxydiphenylene, or 9,9-fluorenediphenylene.

In general, the hydroxy-functionalized polyetheramine salts of the present invention can be prepared by: 1) dissolving a hydroxy-functionalized polyetheramine in a suitable solvent and then adding a protonic acid or an alkyl halide, neat or in a suitable solvent, at a temperature, pressure and time sufficient to yield the desired reaction, and then isolating the resulting salt using methods familiar to those skilled in the art, (2) placing a hydroxy-functionalized polyetheramine in water containing a protonic acid or alkyl halide and letting the acid or alkyl halide be absorbed into the solid poly(hydroxyaminoether) polymer over a period of time sufficient to allow the absorption to take place, or (3) allowing a molten hydroxy-functionalized polyetheramine to come into contact with a protonic acid or alkyl halide.

Preferably, the hydroxy-functionalized polyetheramines which can be employed in the practice of the present invention for preparing the hydroxy-functionalized polyetheramine salts contain either one or a combination of the following repeat units:

$$-OCH_2\overset{OH}{\underset{R^1}{C}}CH_2\overset{}{\underset{R^2}{N}}CH_2\overset{OH}{\underset{R^1}{C}}CH_2OR^4-$$

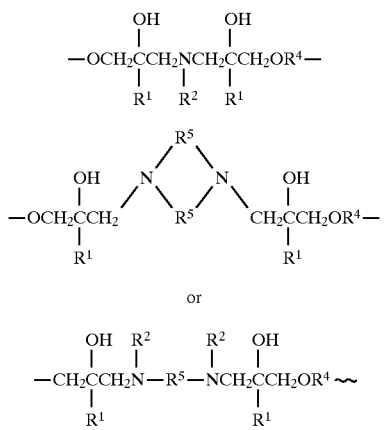

or $$-CH_2\overset{OH}{\underset{R^1}{C}}CH_2\overset{R^2}{\underset{}{N}}-R^5-\overset{R^2}{\underset{}{N}}CH_2\overset{OH}{\underset{R^1}{C}}CH_2OR^4\sim$$

wherein $R^1$, $R^2$, $R^4$ and $R^5$ are as defined previously.

Preferred hydroxy-functionalized polyetheramines are prepared by contacting one or more of the diglycidyl ethers of a dihydric phenol with an amine having two amine hydrogens under conditions sufficient to cause the amine moieties to react with epoxy moieties to form a polymer backbone having amine linkages, ether linkages and pendant hydroxyl moieties. These polyetheramines are described in U.S. Pat. No 5,275,853, incorporated herein by reference.

Protonic acids which can be employed in the practice of the present invention for preparing the hydroxy-functionalized polyetheramine salts include hydrobromic acid, hydrochloric acid, hydrofluoric acid, hydriodic acid, nitric acid, phosphoric acid, sulfuric acid, phosphorus acid, p-toluenesulfonic acid, trichloroacetic acid, dichloroacetic acid, chloroacetic acid, acetic acid, benzoic acid, stearic acid, 1,4-butanedicarboxylic acid, citric acid, benzenesulfonic acid, dinitrobenzdoic acid, and the like. Preferred protonic acids are hydrochloric acid, nitric acid, p-toluenesulfonic acid; more preferred are hydrochloric acid and p-toluenesulfonic acid; and most preferred is hydrochloric acid.

While the amount of protonic acids used depends on a variety of factors, including the specific hydroxy-functionalized polyetheramine employed and the desired end uses of the hydroxy-functionalized polyetheramine salts, in general, the protonic acids can be present in an amount of 1 acid group for every 1 to 30 nitrogen atoms, preferably 1 acid group for every 1 to 10 nitrogen atoms and, most preferably, 1 acid group for every 1 to 3 nitrogen atoms.

Alkyl halides which can be employed in the practice of the present invention for preparing the hydroxy-functionalized polyetheramine salts include ethyl bromide, ethyl chloride, propyl bromide, propyl chloride, 2-bromoethanol, 2-chloroethanol, bromopropanol, chloropropanol, benzyl bromide, benzyl chloride, hydroxybenzyl bromide, hydroxybenzyl chloride, epichlorohydrin and the like. Preferred halides are ethyl bromide, ethyl chloride, 2-bromoethanol, 2-chloroethanol, benzyl bromide, benzyl chloride; more preferred halides are ethyl bromide, 2-bromoethanol, benzyl bromide; and most preferred halide are 2-bromoethanol, benzyl bromide and benzyl chloride.

While the amount of alkyl halide used depends on a variety of factors, including the specific hydroxy-functionalized polyetheramine employed and the desired end uses of the hydroxy-functionalized polyetheramine salt, in general, the alkyl halide can be present in an amount of 1 halide group for every 1 to 30 nitrogen atoms, preferably 1 halide group for every 1 to 5 nitrogen atoms and, most preferably, 1 halide group for every 1 to 1 to 3 nitrogen atoms.

The conditions at which the reaction is most advantageously conducted are dependent on a variety of factors, including the specific reactants, solvent, and catalyst employed, if any. In general, the reaction is conducted under a non-oxidizing atmosphere such as a blanket of nitrogen or other inert gases, preferably at a temperature of from about 25° C. to about 110° C., more preferably at a temperature of from about 25° to about 100° C. and most preferably at a temperature of from about 25° to about 95° C. The reaction can be conducted neat (without solvent or other diluents) in molten hydroxy-functionalized polyetheramines in, for example, an extruder, where temperatures have to be appreciably higher. However, it is often desirable to use inert organic solvents. Examples of suitable solvents include N-methylpyrrolidinone (NMP), methyl benzoate, ethyl benzoate, butyl benzoate; cyclopentanone, cyclohexanone, cycloheptanone, cyclooctanone, cyclohexylpyrrolidinone; and ethers or hydroxy ethers such as diglyme, triglyme, diethylene glycol ethyl ether, diethylene glycol methyl ether, dipropylene glycol methyl ether, dipropylene glycol dimethyl ether, propylene glycol phenyl ether, propylene glycol methyl ether and tripropylene glycol methyl ether; toluene, mesitylene, xylene, benzene, dipropylene glycol monomethyl ether acetate, halogenated solvents such as dichlorobenzene, propylene carbonate, diphenyl ether, butyrolactone, dimethylacetamide, dimethylformamide and mixtures thereof. The preferred solvents are propylene glycol methyl ether, dimethyl formamide, and mixtures thereof.

The polymers are recovered from the reaction mixture by conventional methods. For example, the reaction mixture containing the polymer as a precipitate can be filtered to remove the solid polymer. The solid polymer can then be rinsed with water, methanol, and ether or other solvents which are non-solvents for the monomer, but good solvents for the impurities.

Films prepared from the hydroxy-functionalized polyetheramine salts of the present invention generally have oxygen transmission rates (OTR) of less than 0.5 $cm^3$-mil/100 $in^2$-atm($O_2$)-day.

The hydroxy-functionalized polyetheramine salts of the present invention are suitable for use in fabricating molded, extruded or foamed articles, containers, films, film laminates, water absorbing articles and the likes, using conventional fabricating techniques such as extrusion, compression molding, injection molding, blow molding and similar fabrication techniques commonly used to produce such articles. Examples of such articles include films, foams, sheets, pipes, rods, bags and boxes. In preparing such articles, additives such as fillers, pigments, carbon black, conductive metal particles, abrasives and lubricating polymers may be employed. The method of incorporating the additives is not critical and they can conveniently be added to the polymer prior to preparing the article. If the polymer is prepared in solid form, the additives can be added to the melt prior to processing into a shaped article.

The hydroxy-functionalized polyetheramine salts of the present invention can be applied in liquid form to various substrates by a number of methods such as dip coating, roll coating, brushing (for example as a varnish), spray coating, dispersion-spraying, solution-casting, and slurry-spraying; or in solid form by powder coating, dry-powder-spraying, fluidized bed techniques and extruding molten polymer.

When applying the hydroxy-functionalized polyetheramine salts of the present invention in liquid form, specific conditions of polymerization and other processing parameters most advantageously employed are dependent on a variety of factors, particularly the specific hydroxy-functionalized polyetheramine salts being deposited, the conditions of coating, the coating quality and thickness, and the end-use application.

Substrate(s) which can be coated with the hydroxy-functionalized polyetheramine salts of the present invention can be any material which has sufficient integrity to be coated with the polymer. Representative examples of suitable substrates include wood, metal, ceramics, glass, other polymers, paper, paper board cloth, woven fibers, non-woven fiber mats, synthetic fibers, Kevlar™, carbon fibers, and the like. The substrates which are employed are selected based on the desired application.

The substrate may be of any shape, and the shape is dependent on the end-use application. For instance, the substrate may be in the form of a wire, tube, board, sphere, rod, pipe, cylinder, brick, fiber, woven or non-woven fabric, yarn (including commingled yarns), ordered polymers, and woven or non-woven mat. In each case the substrate may be hollow or solid. In the case of hollow objects, the polymer layer(s) is on either or both the inside or outside of the substrate. The substrate may comprise a porous layer, such as graphite mat or fabric, glass mat or fabric, a scrim, and particulate material.

The following working examples are given to illustrate the invention and should not be construed as limiting its scope. Unless otherwise indicated, all parts and percentages are by weight.

EXAMPLE 1

To a 150 mL reaction flask equipped with an overhead stirrer, nitrogen pad, condenser and temperature controller is added hydroxy-functionalized polyetheramine (Polymer A, having structure A) (24 g) and DOWANOL PM (40 mL). The mixture is heated to 110° C. and stirred until dissolved. The solution is allowed to cool to 30° C. To the solution is added conc. HCl (1 g) and the mixture is stirred for 30 minutes, diluted with dimethylformamide (10 g) and heated to 90° C. The reaction mixture is cooled to 60° C. The polymer is isolated by slowly pouring the reaction mixture into a high speed blender containing an ice mixture (1500 mL of crushed ice and 900 mL of water). The polymer is collected by filtration and dried overnight in vacuo at 50° C. It has the following structural formula:

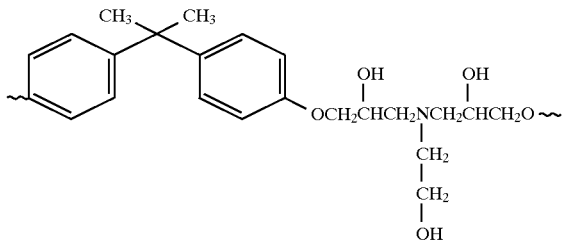

The polymer has the following properties:
Percent Cl: 1.8[a]
Weight average molecular weight (Mw): 104839[b]
Number average molecular weight (Mn): 63329[b]
z average molecular weight (Mz): 144243[b]
Glass transition temperature (Tg): 78° C.

[a]Determined by ASTM E442-91
[b]Determined by Gel Permeation Chromatography
[c]Determined by using a DuPont Model 2100 differential scanning colorimeter (DSC) operation in a heating mode at 20° C./minute

EXAMPLE 2

To a 150 mL reaction flask equipped with an overhead stirrer, nitrogen pad, condenser and temperature controller is added Polymer A (24 g) and DOWANOL PM (40 mL). The reaction mixture is heated to 110° C., stirred until it is dissolved and allowed to cool to 30° C. Concentrated HCl (2 g) is then added and the mixture stirred for 30 minutes, diluted with dimethylformamide (10 g) and heated to 90° C. The reaction product is cooled to 60° C. The hydroxy-functionalized polyetheramine salt is isolated by slowly pouring the reaction mixture into a high speed blender containing an ice mixture (1500 mL of crushed ice and 900 mL of water). The salt is collected by filtration and dried overnight in vacuo at 50° C. It has the following properties (determined as in Example 1):

Percent Cl: 2.8
Weight average molecular weight (Mw): 105722
Number average molecular weight (Mn): 64638
z average molecular weight (Mz): 144643
Glass transition temperature (Tg): 80° C.

EXAMPLE 3

To a 150 mL reaction flask equipped with an overhead stirrer, nitrogen pad, condenser and temperature controller is added Polymer A (20 g) and DOWANOL* PM (50 g). The mixture is heated to 90° C., stirred until it is dissolved and then cooled to 30° C. Concentrated HCl (1.8 g) is added and the reaction mixture is diluted with dimethylformamide (50 g) and then heated to 85° C. and maintained at that temperature for 2 hours. The reaction product is cooled and collected. The polymer mixture is dried in a vacuum oven at 120° C. overnight.

It has the following properties (determined as in Example 1):
Percent Cl: 4.0
Weight average molecular weight (Mw): 105895
Number average molecular weight (Mn): 59971
z average molecular weight (Mz): 145089
Glass transition temperature (Tg): 75° C.

The solid hydroxy-functionalized polyetheramine salt is compression molded into 4"×4"×0.01041 films for oxygen permeability testing. The films have an OTR of 0.27 $cm^3$-mil/100 $in^2$-atm ($O_2$)-day at 51.5 percent RH A film of hydroxy-functionalized polyetheramine which has not been treated with a protonic acid or an alkyl halide is molded under conditions identical to those used above. The film is tested for oxygen permeability and found to have an OTR of 1.0 $cm^3$-mil/100 $in^2$-atm ($O_2$)-day at 60 percent RH.

The oxygen transmission rates in this example and in the following examples are determined by ASTM method D-3985-81.

EXAMPLE 4

To a 150 mL reaction flask equipped with an overhead stirrer, nitrogen pad, condenser and temperature controller is added Polymer A (24 g) and DOWANOL* PM (40 mL). The mixture is heated to 110° C., stirred until it is dissolved and allowed to cool to 30° C. Concentrated HCl (4 g) is added and the mixture is stirred for 30 minutes, diluted with dimethylformamide (25 g), heated to 90° C. and then cooled to 60° C. The polymer is isolated by slowly pouring the reaction mixture into a high speed blender containing an ice mixture (1500 mL of crushed ice and 900 mL of water). The hydroxy-functionalized polyetheramine salt (62.1 g) is collected by filtration and dried overnight in vacuo at 50° C. The dried polymer weighs 11.8 grams (426 percent water absorbed). It has the following properties (determined as in Example 1):

Percent Cl: 5.2
Weight average molecular weight (Mw): 109171
Number average molecular weight (Mn): 68442
z average molecular weight (Mz): 146597
Glass transition temperature (Tg): 81° C.

EXAMPLE 5

To a 150 mL reaction flask equipped with an overhead stirrer, nitrogen pad, condenser and temperature controller is added Polymer A (24 g) and DOWANOL* PM (40 mL). The mixture is heated to 110° C., stirred until it is dissolved and allowed to cool to 30° C. Concentrated HCl (6 g) is added and the mixture is stirred for 30 minutes, diluted with dimethylformamide (35 g), heated to 90° C. and then cooled to 60° C. The polymer is isolated by slowly pouring the reaction mixture into a high speed blender containing an ice mixture (1500 mL of crushed ice and 900 mL of water). The polymer (120 g) is collected by filtration, dried overnight in vacuo at 50° C. The dried polymer weighs 5.8 grams (1969 percent water absorbed). It has the following properties (determined as in Example 1):

Percent Cl: 8.6
Weight average molecular weight (Mw): 111897
Number average molecular weight (Mn): 75827
z average molecular weight (Mz): 148522
Glass transition temperature (Tg): 79° C.

EXAMPLE 6

To a 150 mL reaction flask equipped with an overhead stirrer, nitrogen pad, condenser and temperature controller is added Polymer A (20 g) and DOWANOL* PM (50 g). The mixture is heated to 90° C., stirred until it is dissolved and then cooled to 30° C. A 70 percent solution of $HNO_3$ (1.6 g) is added after adding 1.6 g of water. The reaction mixture is diluted with dimethylformamide (6 g) and then stirred for 30 minutes. The polymer product is cooled and collected by filtration. The polymer is dried in a vacuum oven at 120° C. overnight. The solid hydroxy-functionalized polyetheramine salt is compression molded into 4"×4"×0.010" films for oxygen permeability testing. The films have an OTR of 0.34 $cm^3$-mil/100 $in^2$-atm ($O_2$)-day at 51.5 percent RH.

EXAMPLE 7

To a reaction vessel is added 10 g of Polymer A in 30 mL of N,N-dimethylacetamide (DMAC) at room temperature under nitrogen. Benzyl bromide (3.0 mL) is added dropwise with vigorous stirring at about 25° C. The temperature is increased to 50° C. after 1 hr. The mixture is left overnight and then heated to 80° C. and maintained at that temperature for 4 hours. The reaction mixture is cooled and the polymer precipitated in water/methanol mixture and collected by filtration. The polymer is dried in a vacuum oven at 90°–100° C. The solid hydroxy-functionalized polyetheramine salt is compression molded into 4"×4"×0.010" films for oxygen permeability testing. The films have an OTR of 0.89 $cm^3$-mil/100 $in^2$-atm ($O_2$)-day at 60 percent RH.

EXAMPLE 8

To a reaction vessel is added Polymer A (10.1 g) in 25 mL of DMAC at room temperature under nitrogen. 2-Bromoethanol (4.0 mL) is added dropwise with vigorous stirring at about 25° C. The temperature is increased to 60° to 70° C. and maintained for 5 days. The polymer is isolated by precipitation into 2-propanol. It is redissolved in tetrahydrofuran/water (2/1 ratio) and reprecipitated into 2-propanol and dried in vacuo at about 120° C. The solid hydroxy-functionalized polyetheramine salt is compression molded into 4"×4"×0.010" films for oxygen permeability testing. The films have an OTR of 0.39 $cm^3$-mil/100 $in^2$-atm ($O_2$) -day at 60 percent RH.

What is claimed is:

1. A hydroxy-functionalized polyetheramine salt wherein at least one of the backbone nitrogen atoms is tetracoordinate and positively charged and the total positive charge is balanced with negatively charged counter ions.

2. The hydroxy-functionalized polyetheramine salt of claim 1 represented by Formulas I, II or III:

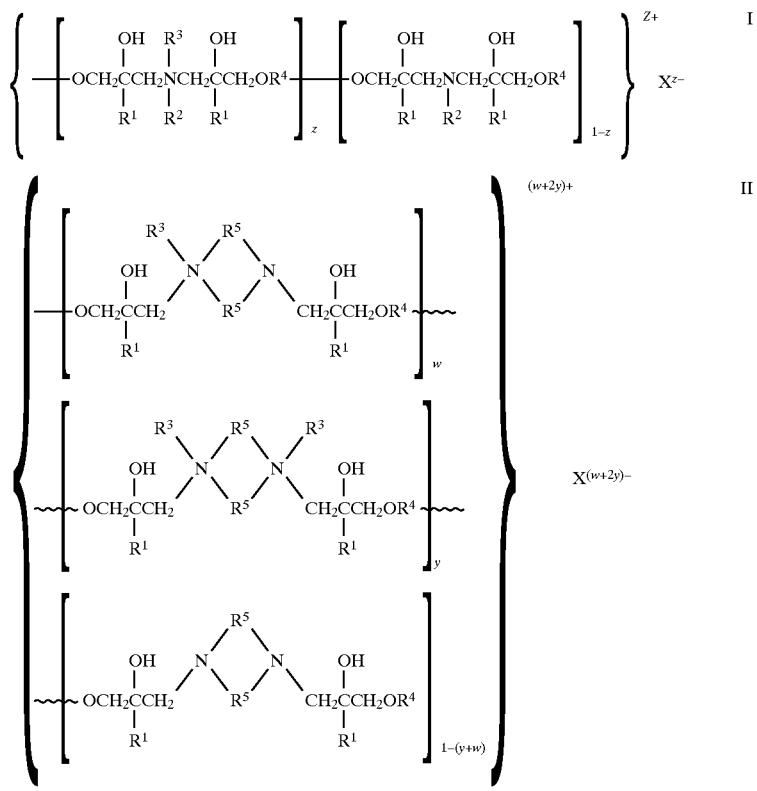

-continued

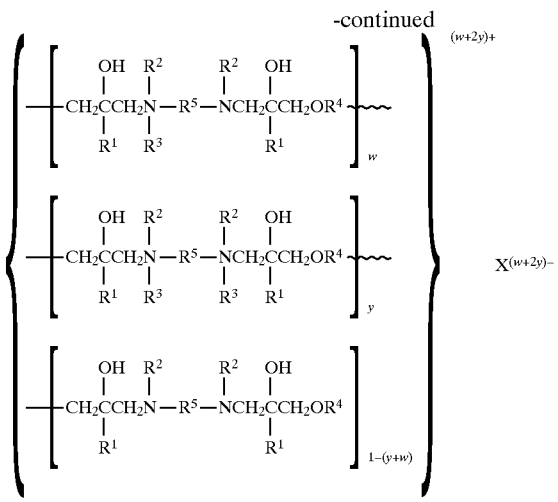

wherein $R^1$ is a hydrocarbyl group or hydrogen; $R^2$ is a hydrocarbyl or substituted hydrocarbyl group; $R^3$ is hydrogen, a hydrocarbyl or substituted hydrocarbyl group, wherein the substituent(s) in the substituted hydrocarbyl group is hydroxyl, cyano, halo, arlyloxy, alkylamido, arylamido, alkylcarbonyl, or arylcarbonyl; $R^4$ and $R^5$ are independently hydrocarbylene moieties; z is a number from about 0.01 to about 1.0; w is a number from 0 to 1.0 and y is a number from 0 to 1.0 such that (w+y) equals about 0.01 to 1.0; n is an number from about 5 to 1000 and X is a negatively charged counter ion or combination of such ions present in sufficient amount to balance the total positive charge of the tetracoordinate nitrogen atoms.

3. The hydroxy-functionalized polyetheramine salt of claim 2 wherein $R^1$ is alkyl or hydrogen.

4. The hydroxy-functionalized polyetheramine salt of claim 2 wherein $R^2$ is methyl, ethyl, propyl, butyl, pentyl, hexyl, cyclohexyl, benzyl, phenyl, 2-hydroxyethyl, 2-hydroxypropyl, 3-hydroxypropyl, 2-acetamidoethyl or a combination of these moieties.

5. The hydroxy-functionalized polyetheramine salt of claim 2 wherein $R^3$ is hydrogen, methyl, ethyl, propyl, or butyl.

6. The hydroxy-functionalized polyetheramine salt of claim 2 wherein $R^4$ is ethylene, propylene, butylene, ethyleneoxyethylene, propyleneoxypropylene, 1,3-phenylene, 1,4-phenylene, isopropylidenediphenylene, oxydiphenylene, thiodiophenylene, carbonyldiphenylene, methylenediphenylene or a combination of these moieties.

7. The hydroxy-functionalized polyetheramine salt of claim 2 wherein $R^5$ is ethylene or 1,2-propylene.

8. The hydroxy-functionalized polyetheramine salt of claim 2 wherein X is a halide, nitrate, sulfate, phosphate or phosphonate.

9. The hydroxy-functionalized polyetheramine salt of claim 2 wherein X is a carboxylate, multifunctional carboxylate, sulfonate or multifunctional sulfonate.

10. The hydroxy-functionalized polyetheramine salt of claim 9 wherein X is acetate, benzoate, stearate, 1,4-butanedicarboxylate, citrate, benzenesulfonate, or p-toluenesulfonate.

11. The hydroxy-functionalized polyetheramine salt of claim 2 formed by reacting a protonic acid or an alkyl halide with a hydroxy-functionalized polyetheramine containing either one or a combination of the repeating units:

III

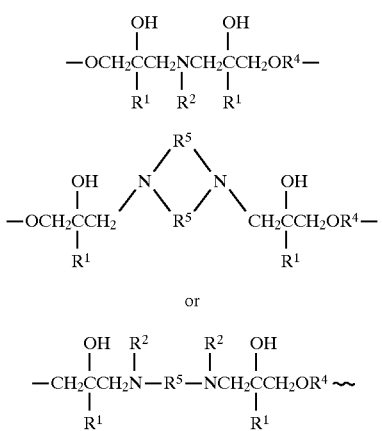

wherein $R^1$, $R^2$, $R^4$ and $R^5$ are as defined previously.

12. A process which comprises contacting a hydroxy-functionalized polyetheramine with a protonic acid or an alkyl halide or substituted alkyl halide under conditions sufficient to form the hydroxy-functionalized polyetheramine salt of claim 1.

13. The process of claim 12 wherein the hydroxy-functionalized polyetheramine is molten.

14. The process of claim 12 wherein the hydroxy-functionalized polyetheramine is dissolved in a solvent.

15. The process of claim 9 wherein the hydroxy-functionalized polyetheramine is suspended in an aqueous protonic acid.

16. The process of claim 9 wherein the hydroxy-functionalized polyetheramine contains either one or a combination of the following repeating units:

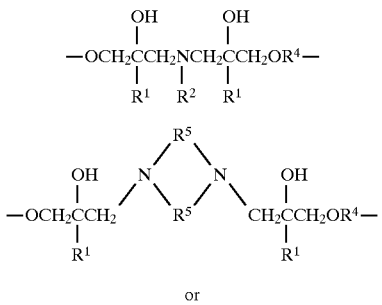

or

-continued

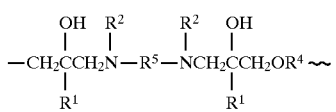

wherein $R^1$, $R^2$, $R^4$ and $R^5$ are as defined previously.

17. The hydroxy-functionalized polyetheramine salt of claim 1 in the form of a film, coating, laminate, adhesive, foam, molded article, extruded article, flexible container or rigid container, or packaging material.

18. The hydroxy-functionalized polyetheramine salt of claim 1 in the form of a water absorbing article.

* * * * *